(12) United States Patent
Boeuf et al.

(10) Patent No.: US 11,609,378 B2
(45) Date of Patent: Mar. 21, 2023

(54) PHOTONIC IC CHIP

(71) Applicants: STMicroelectronics S.r.l., Agrate Brianza (IT); STMicroelectronics (Crolles 2) SAS, Crolles (FR)

(72) Inventors: Frédéric Boeuf, Le Versoud (FR); Luca Maggi, Garlate (IT)

(73) Assignees: STMicroelectronics (Crolles 2) SAS, Crolles (FR); STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/649,520

(22) Filed: Jan. 31, 2022

(65) Prior Publication Data

US 2022/0155519 A1    May 19, 2022

Related U.S. Application Data

(62) Division of application No. 16/821,370, filed on Mar. 17, 2020, now Pat. No. 11,269,141.

(30) Foreign Application Priority Data

Mar. 25, 2019    (FR) ........................................ 1903064

(51) Int. Cl.
*G02B 6/124* (2006.01)
*G02B 6/34* (2006.01)
*G02B 6/43* (2006.01)
*G02B 6/30* (2006.01)
*G02B 6/12* (2006.01)
*G02B 6/136* (2006.01)

(52) U.S. Cl.
CPC ......... *G02B 6/124* (2013.01); *G02B 6/12004* (2013.01); *G02B 6/136* (2013.01); *G02B 6/30* (2013.01); *G02B 6/34* (2013.01); *G02B 6/43* (2013.01); *G02B 2006/12061* (2013.01)

(58) Field of Classification Search
CPC .......... G02B 6/30; G02B 6/34; G02B 6/4201; G02B 6/43; G02B 6/124; G02B 6/12004; G02B 6/136; G02B 6/4214
See application file for complete search history.

(56) References Cited

U.S. PATENT DOCUMENTS

| 2002/0106163 A1 | 8/2002 | Cairns |
| 2003/0007742 A1 | 1/2003 | Kowatsch |
| 2015/0097257 A1* | 4/2015 | Gambino ............... G02B 6/122 438/69 |

(Continued)

FOREIGN PATENT DOCUMENTS

| CN | 105762220 A | 7/2016 |
| CN | 107040318 A | 8/2017 |
| CN | 211856976 U | 11/2020 |

*Primary Examiner* — Michael P Mooney
(74) *Attorney, Agent, or Firm* — Slater Matsil, LLP

(57) ABSTRACT

A photonic integrated circuit chip includes vertical grating couplers defined in a first layer. Second insulating layers overlie the vertical grating coupler and an interconnection structure with metal levels is embedded in the second insulating layers. A cavity extends in depth through the second insulating layers all the way to an intermediate level between the couplers and the metal level closest to the couplers. The cavity has lateral dimensions such that the cavity is capable of receiving a block for holding an array of optical fibers intended to be optically coupled to the couplers.

20 Claims, 5 Drawing Sheets

(56) References Cited

U.S. PATENT DOCUMENTS

| | | |
|---|---|---|
| 2017/0115458 A1 | 4/2017 | Mekis et al. |
| 2017/0160482 A1 | 6/2017 | Frankel et al. |
| 2018/0188459 A1* | 7/2018 | Mekis ................ H04B 10/801 |
| 2020/0066656 A1 | 2/2020 | Polomoff et al. |
| 2020/0161482 A1 | 5/2020 | Hon et al. |
| 2020/0310027 A1 | 10/2020 | Boeft et al. |

* cited by examiner

PHOTONIC IC CHIP

CROSS-REFERENCE TO RELATED APPLICATIONS

This application claims priority to French Patent Application No. 1903064, filed on Mar. 25, 2019, which application is hereby incorporated by reference herein in its entirety.

TECHNICAL FIELD

The present disclosure generally concerns photonic integrated circuits (optical and optoelectronic).

BACKGROUND

During a test step or during the operation of a photonic integrated circuit, optical signals are supplied to optical inputs of the circuit and corresponding optical signals may be observed or are available at the level of optical outputs of the circuit. Optical fibers are used to transmit optical signals to the optical inputs of the circuit, for example, optical signals supplied by one or a plurality of sources of optical signals external to the circuit. Optical fibers may also be used to transmit the optical signals available at the level of the optical outputs of the circuit to devices external to the circuit, for example, to devices of analysis of the optical signals.

The optical fibers used to exchange optical signals with a photonic integrated circuit are generally organized in a fiber array, the fibers of the array being held in place with respect to one another in a holding block. The fibers are arranged in the holding block so that they all have a first end flush with a same surface of the holding block. The distribution of the first ends corresponds to the distribution of a plurality of optical inputs and/or outputs of the circuit. Thus, when the first ends of the fibers of the fiber array are arranged opposite such a plurality of optical inputs and/or outputs of the circuit, a plurality of optical signals may be exchanged with the circuit.

SUMMARY

The present disclosure generally concerns photonic integrated circuits (optical and optoelectronic). Particular embodiments concern the exchange of optical signals with such circuits during a test step or during the operation of such circuits.

Embodiments can overcome all or part of the disadvantages of known photonic integrated circuits, for example, as concerns the way to optically couple optical inputs and/or outputs of these circuits to optical fibers of a fiber array arranged in the holding block.

An embodiment provides a photonic integrated circuit chip comprising a plurality of couplers with a vertical grating coupler, defined in a first semiconductor or insulating layer topped with an interconnection structure comprising a plurality of metal levels embedded in second insulating layers. A cavity extends in depth through the second insulating layers down to an intermediate level between the couplers and the metal level closest to the couplers. The cavity has lateral dimensions such that the cavity is capable of receiving a block for holding an array of optical fibers intended to be optically coupled to the couplers.

According to an embodiment, the lateral dimensions of the cavity are equal to the lateral dimensions of the block plus a tolerance margin.

According to an embodiment, the tolerance margin is in the range from 10 µm to 200 µm, preferably from 50 µm to 150 µm, preferably substantially equal to 100 µm.

According to an embodiment, the first layer is a semiconductor layer, preferably made of silicon, of semiconductor on insulator type.

According to an embodiment, the first layer is an insulating layer made of silicon nitride.

According to an embodiment, the first layer rests on a third semiconductor layer, preferably made of silicon, of semiconductor on insulator type.

According to an embodiment, the bottom of the cavity is opposite the plurality of couplers.

According to an embodiment, the chip further comprises, on an upper surface of the interconnection structure, a guard ring surrounding the cavity, the guard ring being configured to avoid a flow of glue beyond the ring when the glue is arranged in the cavity and the block is inserted into the cavity.

According to an embodiment, the guard ring is formed of a plurality of metal micropillars regularly distributed along the circumference of the guard ring.

Another embodiment provides an assembly comprising a chip such as defined hereabove and a block for holding the fiber array inserted into the cavity.

According to an embodiment, the assembly further comprises glue, preferably epoxy, arranged in the cavity, at least between the bottom of the cavity and a surface of the block opposite the bottom of the cavity, the glue holding the block in place in the cavity.

Another embodiment provides a semiconductor wafer comprising a plurality of chips such as defined hereabove, or a plurality of assemblies such as defined hereabove.

Another embodiment provides a method implemented from a semiconductor wafer comprising a plurality of photonic circuit chips, each comprising a plurality of couplers with a vertical grating coupler defined in a first semiconductor layer or a first insulating layer topped with an interconnection structure comprising a plurality of metal levels embedded in second insulating layers, the method comprising the step of etching, from an upper surface of the interconnection structure, a cavity penetrating into the second layers all the way to intermediate level between the couplers and the metal level closest to the couplers, the cavity having lateral dimensions such that the cavity is capable of receiving a block for holding an array of optical fibers intended to be optically coupled to the couplers.

According to an embodiment, the method further comprises a step of sawing the wafer to individualize the chips.

According to an embodiment, the method comprises, for at least one chip, the steps of: arranging glue, preferably epoxy, in the chip cavity; inserting and positioning the block in the cavity to optically couple ends of the fibers to the couplers; and hardening the glue, preferably by polymerization caused by an exposure to a light radiation, preferably ultraviolet.

The foregoing and other features and advantages will be discussed in detail in the following non-limiting description of specific embodiments in connection with the accompanying drawings.

DETAILED DESCRIPTION OF ILLUSTRATIVE EMBODIMENTS

Figure 1:
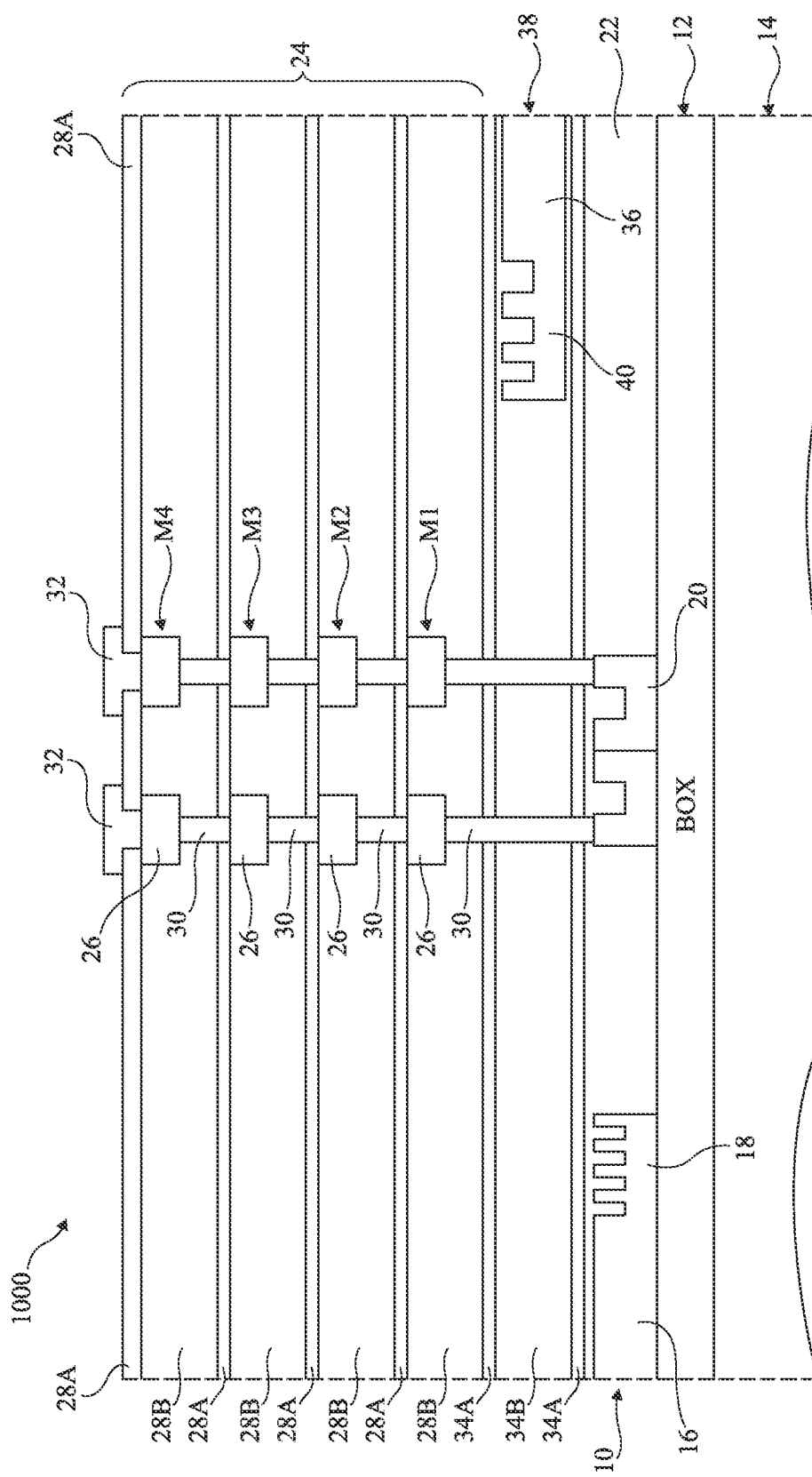
FIG. 1 schematically shows in cross-section view an embodiment of a photonic integrated circuit of the type to which the described embodiments apply as an example.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the manufacturing, the operation, and the testing (selection of the optical and electrical input signals and interpretation of the corresponding output signals) of the photonic integrated circuits have not been detailed, the described embodiments being compatible with usual photonic integrated circuits.

Throughout the present disclosure, the term (electrically or optically) "connected" is used to designate a direct electrical or optical connection between circuit elements, without intermediate element other than electrical conductors or optical waveguides, whereas the term (electrically or optically) "coupled" is used to designate an electrical or optical connection between circuit elements that may be direct, or may be via one or more other elements. Further, unless otherwise specified, when reference is made to an optical fiber and an optical input or output optically coupled together, this means that the fiber and the optical input or output are arranged so that an optical signal can be transmitted between the fiber and the optical input or output, otherwise than by evanescent coupling or near-field coupling, and the distance between the optical fiber and the optical input or output thus coupled may then be greater than one or a plurality of times the wavelength of the optical signal.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "approximately", "substantially", and "in the order of" are used herein to designate a tolerance of plus or minus 10%, preferably of plus or minus 5%, of the value in question.

FIG. 1 schematically shows in the form of blocks an embodiment of a photonic integrated circuit chip 1000 of the type to which the described embodiments apply as an example, it being understood that the embodiments which will be described hereafter are not limited to this specific example of chip or of photonic integrated circuit.

Chip 1000 comprises a semiconductor layer 10, preferably made of silicon, resting on an insulating layer 12 (BOX), preferably made of silicon oxide, itself resting on a support 14 such as a silicon substrate. Layer 10 is said to be of SOI ("Semiconductor On Insulator") type or simply a layer of an SOI device.

In this embodiment, various optical and/or optoelectronic components are defined inside and/or on top of layer 10. In particular, waveguides 16 are defined in layer 10, a single waveguide 16 being shown in FIG. 1. Optical inputs and/or outputs 18 of chip 1000, that is, optical inputs and/or outputs of the photonic integrated circuits that it comprises, are arranged at ends of waveguides 16, a single optical input 18 being shown in FIG. 1. In the described embodiments, the case where these optical inputs and/or outputs are vertical grating couplers (VGC) is considered. Couplers 18 are, like waveguides 16, defined in layer 10. In the example of FIG. 1, a phase modulator 20 is also defined in layer 10.

Layer 10 is covered with an insulating layer 22. Layer 22 is in contact with layer 10. Layers 12 and 22 form an optical sheath having a lower refraction index than layer 10. The upper level of layer 22 is here above the upper level of layer 10 although, as a variation, the upper level of layer 22 may be confounded with the upper level of layer 10.

Although this is not illustrated in FIG. 1, electronic components, for example, transistors, may be defined inside and/or on top of layer 10.

An interconnection structure 24 tops layer 22. Interconnection structure 24 comprises portions of metal layer 26 separated by insulating layers, in this example 28A and 28B, and metal vias 30. Metal vias 30 cross insulating layers 28A, 28B, and possibly a portion of the thickness of insulating layer 22 to electrically couple portions of metal layers 26 together and/or to components of chip 1000 defined inside and/or on top of layer 10 and/or to contact pads 32 arranged at the level of an upper surface of interconnection structure 24. Vias 30 and/or portions of metal layers 26 which are not electrically coupled or connected to a pad 32 and/or to a component of chip 1000 may be provided in interconnection structure 24.

Call metal level or metallization level the assembly of the portions of metal layers 26 arranged at a same level in interconnection structure 24. In the shown example, the chip comprises four successive metal levels M1, M2, M3, and M4, metal level M1 being arranged on the side of layer 10, or, in other words, being the metal level closest to layer 10.

In the example of FIG. 1, each metal level M1, M2, M3, and M4 is arranged in a layer 28B, preferably made of silicon oxide, the upper level of the metal level being flush with the upper surface of layer 28B where it is arranged. Further, in the example of FIG. 1, a layer 28A, preferably made of silicon nitride, rests on top of and preferably in contact with the upper surface of each assembly of a metal level and of layer 28B having the metal level arranged therein. Such an alternation of layers 28A and 28B results for example from the manufacturing method implemented to form interconnection structure 24. The described embodiments are not limited to this specific example of interconnection structure 24.

As shown in FIG. 1, one or a plurality of insulating layers, in the present example, insulating layers 34A and 34B, may be arranged or interposed between the assembly of layers 10 and 22 and interconnection structure 24. In this case, vias 30 of interconnection structure 24 may cross insulating layers 34A, 34B to electrically couple components formed inside and/or on top of layer 10 to the rest of the interconnection structure. More particularly, in the example of FIG. 1, a layer 34B, for example made of silicon oxide, is interposed between layer 10 and interconnection structure 24. Preferably, as shown in FIG. 1, a layer 34A, preferably made of silicon nitride, rests on top of and in contact with layer 34B, and layer 34B rests on top of and in contact with another layer 34A, preferably made of silicon nitride.

In this embodiment, a layer 38 is arranged in layer 34B, layer 38 being preferably made of silicon nitride in this example where layer 34B is made of silicon oxide. Layer 34B thus covers layer 38 and is topped with interconnection structure 24. Waveguides 36 are defined in layer 38, a single waveguide 36 being shown in FIG. 1. As for waveguides 16, vertical grating couplers 40 are arranged at ends of waveguides 36. Couplers 40 are, like waveguides 36, defined in layer 38. Couplers 40 form optical inputs and/or outputs of chip 1000.

The operation of a vertical grating coupler is based on diffraction phenomena. Couplers 18 and 40 of chip 1000 are configured to emit (optical output) or receive (optical input) a light beam (optical signal) propagating in a direction substantially orthogonal to the planes of layers 10 and 38, the planes of layers 10 and 38 being here parallel to the upper surface of layer 12. As an example, couplers 18 and 40 are configured to emit or receive a beam in a direction forming an angle alpha with the normal to the planes of layers 10 and 38, angle alpha being for example in the range from 20 to 5 degrees, for example, in the order of 8 or 13 degrees. As an example, a vertical grating coupler occupies a surface area of approximately 20 µm by approximately 30 µm when the received or emitted light beam has a diameter in the order of 10 µm.

Although this is not shown in FIG. 1, chip 1000 comprises at least one assembly of a plurality of couplers 18 intended to be optically coupled to first respective ends of the optical fibers of a fiber array arranged in a holding block. Similarly, chip 1000 comprises at least one assembly of a plurality of couplers 40 intended to be optically coupled to first respective ends of the optical fibers of a fiber array arranged in a holding block.

Waveguides 16 and/or 36 and couplers 18 and/or 40 are preferably configured to operate at wavelengths in near infrared, that is, wavelengths in the range from 1 to 2 µm, preferably equal to approximately 1.3 µm or approximately 1.55 µm, for example, equal to 1.3 µm or 1.55 µm.

An embodiment where chip 1000 comprises silicon couplers 18 and silicon nitride couplers 40 has been shown herein. In an alternative embodiment, not illustrated, couplers 18 may be omitted, chip 1000 then only comprising couplers 40. In this variation, waveguides 16 may possibly be omitted. Conversely, in another alternative embodiment, couplers 40 may be omitted, chip 1000 then only comprising couplers 18. In this other variation, waveguides 36 may possibly be omitted.

Further, chip 1000 may be one of the chips of a plurality of identical chips 1000 manufactured from a same conductive wafer or, in other words, a semiconductor wafer may comprise a plurality of identical chips 1000. Chip 1000 may also be an individualized chip, that is, one of the chips 1000 obtained after a step of sawing of a semiconductor wafer comprising a plurality of identical chips 1000.

Figure 2A:
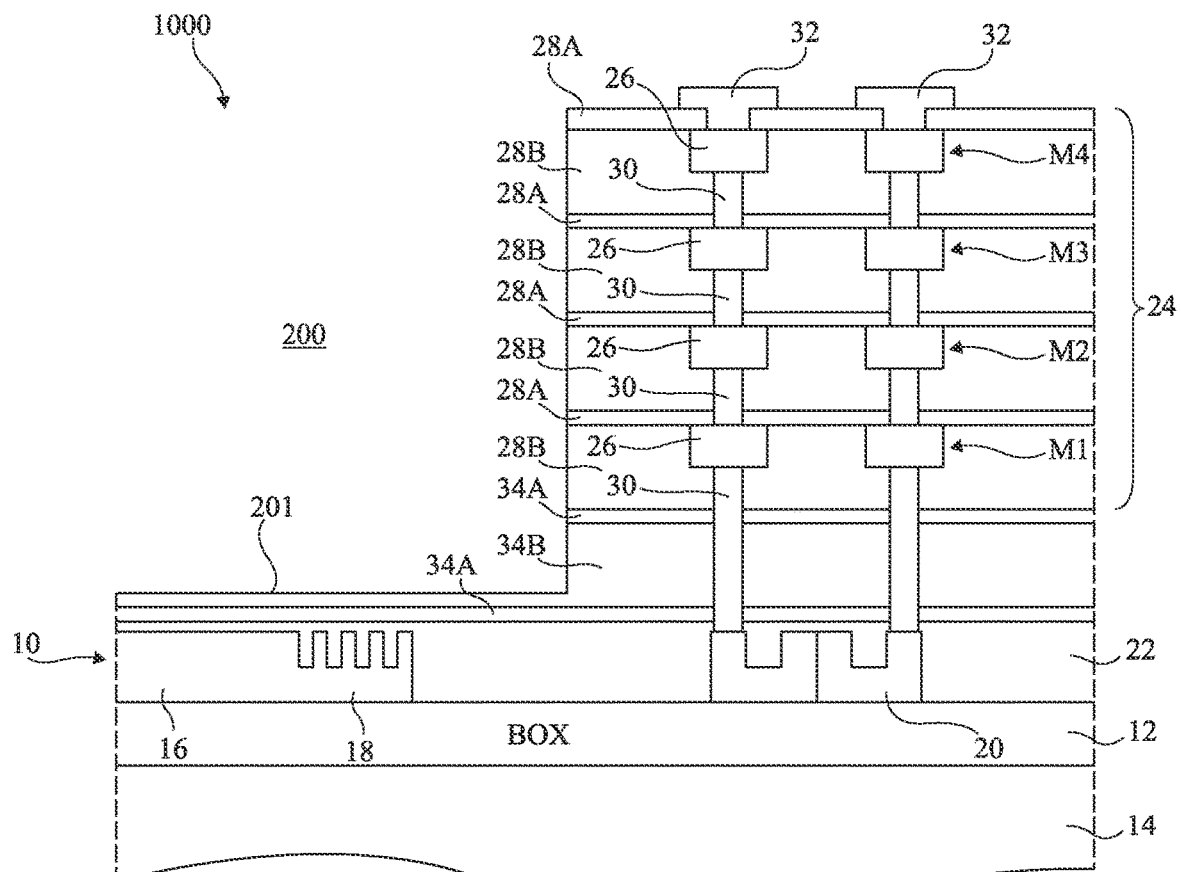
FIG. 2 includes two views in FIGS. 2A and 2B, which illustrate a step of an embodiment of a method.
Figure 2B:
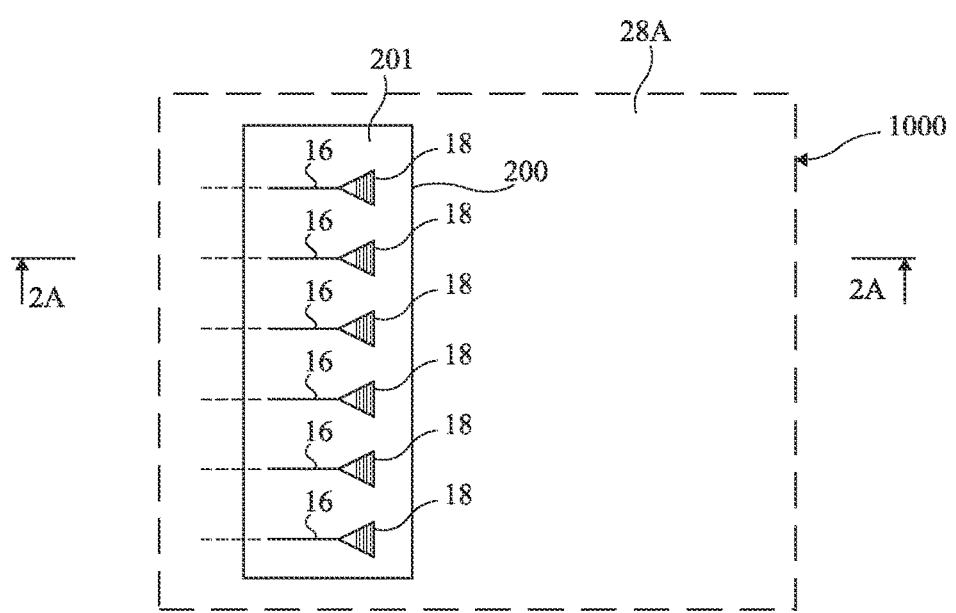

FIG. 2 schematically shows two views (FIG. 2A and FIG. 2B) illustrating a step of an embodiment of a photonic integrated circuit chip manufacturing method, FIG. 2A and FIG. 2B being respective cross-section and top views of a portion of chip 1000 after the implementation of this step. More particularly, the portion of chip 10000 shown in FIG. 2A corresponds to a portion of a cross-section view along the cross-section plane AA of FIG. 2B.

In this embodiment, chip 1000 comprises an assembly of a plurality of couplers 18, in the present example, six couplers 18, intended to be optically coupled to first respective ends of the optical fibers of a fiber array maintained in place in a holding block.

At the step of FIG. 2, chip 1000 preferably forms part of a semiconductor wafer comprising a plurality of identical chips 1000, the step described herein being carried out simultaneously for all the chips 1000 in the wafer.

At this step, a cavity 200 has been etched from the upper surface of interconnection structure 24, that is, from the upper surface of insulating layer 28A at the top of structure 24 in the present example. Cavity 200 is etched through insulating layers 28A and 28B of interconnection structures 24. The etching of cavity 200 is stopped at an intermediate level between the lower level of the metal level closest to couplers 18, here, metal level M1, and the upper level of layer 10 where couplers 18 are defined. In other words, the etching is performed so that the bottom 201 of cavity 200 is arranged at this intermediate level. Preferably, the intermediate level is above the upper level of layer 22 covering layer 10. In the example of FIG. 2, the etching is stopped in layer 34B.

It should be noted that, in FIG. 2B, couplers 18 and adjacent portions of waveguide 16 have been shown in visible fashion, at the bottom of cavity 200, although these couplers 18 and these waveguide portions 16 are coated with at least one insulating layer, in the present example layer 22, lower layer 34A, and a portion of the thickness of layer 34B. Further, in view B, pads 32 have not been shown.

The lateral dimensions of cavity 200 are determined by the dimensions of the fiber array holding block. Thus, cavity 200 is capable of receiving the fiber array holding block. Indeed, the holding block is intended to be at least partly inserted into cavity 200, so that the first ends of the optical fiber array are optically coupled to couplers 18. More particularly, the lateral dimensions of cavity 200 are slightly greater than the corresponding lateral dimensions of the fiber array holding block. Preferably, the lateral dimensions of the cavity are equal to the corresponding lateral dimensions of the holding block, plus a tolerance margin. The tolerance margin is for example in the range from 10 µm to 200 µm, preferably from 50 µm to 150 µm, preferably substantially equal to 100 µm. Such a tolerance margin enables to ascertain that the holding block can be inserted into the cavity despite possible manufacturing dispersions during the etching. The tolerance margin also enables the orientation of the holding block in the cavity to be modified to align the first ends of the fibers of the array and couplers 18, such an alignment taking into account a possible angle alpha between the propagation direction of a light beam between the first end of a fiber of the array and the corresponding coupler 18.

Further, the location of cavity 200 is determined by the location of the couplers 18 with which the first ends of the fibers of the fiber array are intended to be optically coupled. More particularly, the location of cavity 200 is determined so that, when the fiber holding block of the fiber array is inserted into the cavity, the first ends of the fibers of the fiber array are optically coupled to couplers 18, taking into account a possible angle alpha. Preferably, a step of fine alignment of the fibers and of couplers 18 is implemented, during which the orientation of the block in cavity 200 and/or the depth at which the block is inserted into cavity 200 are modified to maximize the optical coupling between the first ends of the fibers of the fiber array and couplers 18.

As an example of dimensions, a block for holding the fibers of a fiber array comprising six fibers has a width in the order of a few millimeters, for example, smaller than 3 mm, for example, in the order of 2 mm, for a length of a few millimeters also, for example shorter than 7 mm, for example, in the order of 5 mm.

Figure 3A:
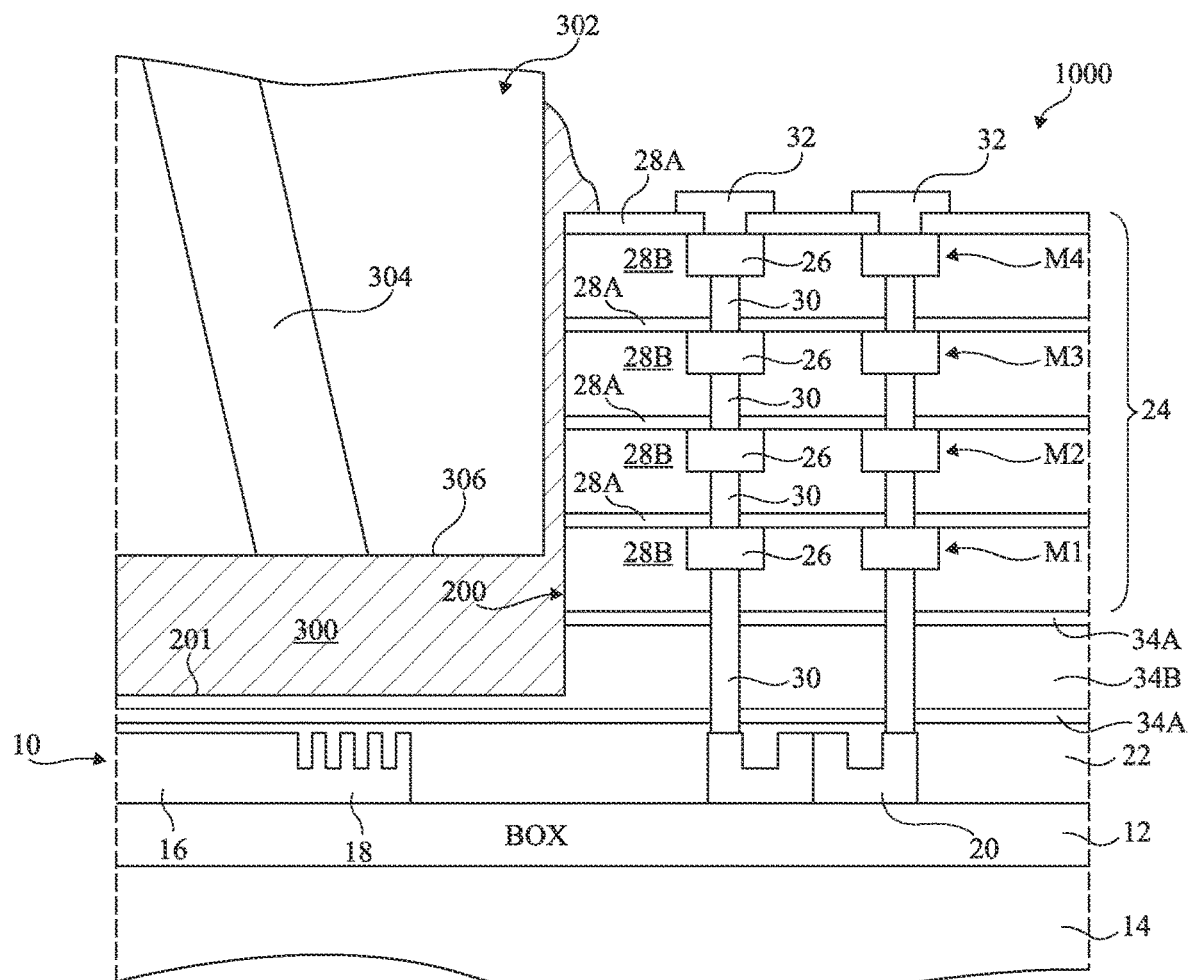
FIG. 3 includes two views in FIGS. 3A and 3B, which illustrate another step of an embodiment of a method.
Figure 3B:
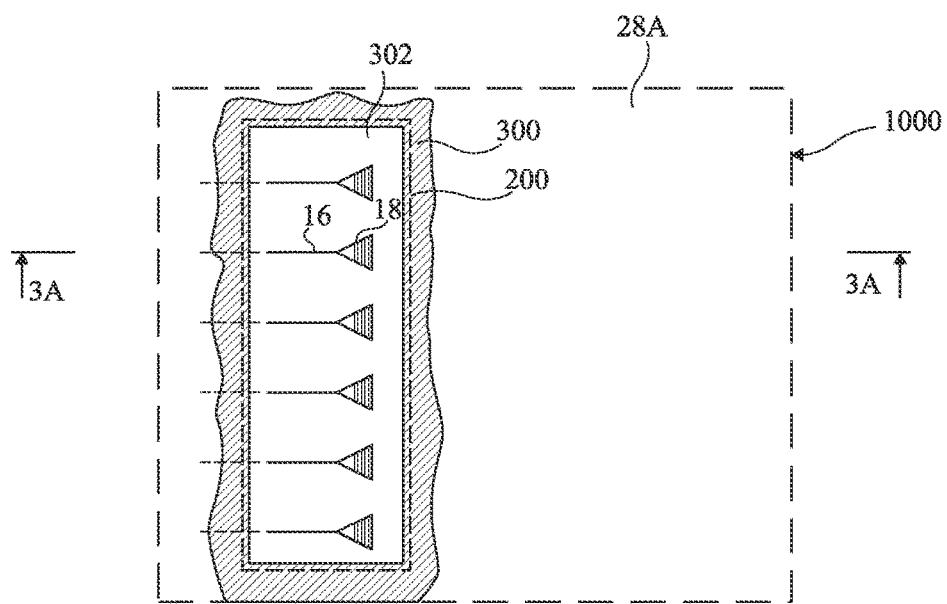

FIG. 3 schematically shows FIG. 3A and FIG. 3B, which illustrate another step of an embodiment of a method. FIGS. 3A and 3B correspond to respective FIGS. 2A and 2B, after the implementation of this other step.

At this step, chip 1000 is preferably an individualized chip, although this step may be implemented while chip 1000 still forms part of a semiconductor chip comprising a plurality of identical chips 1000.

At this step, glue 300 has been arranged in cavity 200. As an example, glue 300 fills cavity 200 and is flush with the exposed surface of interconnection structure 24, glue 300 being also capable of protruding above the level of the exposed surface of interconnection structure 24, for example, by approximately 2 µm. Glue 300 is selected so that an optical signal transmitted between a fiber of the fiber array and a coupler 18 can propagate in the glue. In other words, glue 300 is transparent to the wavelengths of the considered optical signals. As an example, glue 300 is an epoxy glue, preferably an epoxy glue having its hardening resulting from a polymerization, for example caused by illuminating glue 300 with ultraviolet light.

Further, at this step, a holding block 302, for example, made of glass, where fibers 304 of the fiber array are arranged, has been inserted into cavity 200. In view FIG. 3A, a single fiber 304 is visible. In FIG. 3B, fibers 304 have not been shown, while couplers 18 and portions of waveguides 16 have been visibly shown, although they are topped with insulating layers and with block 302.

More particularly, block 302 is inserted so that surface 306 of block 302 having the first ends of fibers 304 flush therewith, that is, the lower surface of block 302 in FIG. 3A, is opposite bottom 201 of cavity 200, and thus opposite couplers 18.

Thus, glue 300 extends from surface 306 of block 302 to bottom 201 of cavity 200. Preferably, the quantity of glue 300 arranged in cavity 200 is selected so that, on insertion of block 302 into cavity 200, glue 300 creeps up along the lateral surfaces of block 302 and at least partly fills the space available between the lateral surfaces of block 302 and the lateral walls of cavity 200. This enables to increase the stability or mechanical resistance of the assembly of chip 1000 and of block 302 after glue 300 has hardened with respect to the case where glue 300 is only present between bottom 201 of cavity 200 and surface 306 of block 302. In the shown example, glue 300 totally fills the available space and overflows on the upper surface of interconnection structure 24.

The orientation of block 302, and possibly the depth at which block 302 is inserted into cavity 200, are determined to optimize, that is, maximize, the optical coupling between fibers 304 and couplers 18. The implementation of a step of maximization of the optical coupling between the fibers of a fiber array holding block and vertical grating couplers of an integrated circuit chip, or fine alignment step, is within the abilities of those skilled in the art and will not be detailed herein. As an example, this step may be implemented by supplying an optical signal to a coupler 18 by means of a fiber 304, and by modifying the orientation of block 302, and possibly the depth at which block 302 is inserted into cavity 200, to maximize an output quantity of the chip, for example, the amplitude of an electric signal depending on the quantity of light received by coupler 18 or also the quantity of light supplied by another coupler 18 optically coupled to the coupler 18 receiving the light.

Once block 302 is positioned in cavity 200, a step of hardening of glue 300 is carried out. For example, glue 300 is hardened by being exposed to a light source, preferably ultraviolet light. According to another example, the glue is hardened by being heated.

Rather than providing cavity 200 to insert block 302 therein, it could have been devised to glue block 302 directly to the upper surface of interconnection structure 24, possibly after having removed, at least at the location where block 302 is glued, the last insulating layer of interconnection structure 24, here 28A, which forms, in practice, a passivation layer.

However, transmission losses between the first end of a fiber 304 of block 302 and a corresponding coupler 18 would have been more significant than in the case illustrated in FIG. 3 due to the larger number of insulating layers 28A and 28B that an optical signal would have crossed between fiber 304 and coupler 18. Such transmission losses would for example have been in the range from 0.1 to 1 dB.

Further, the glue used to glue block 302 to the upper surface of interconnection structure 24 would have spread on the upper surface, farther than when glue 300 is initially arranged in cavity 200 as described in relation with FIG. 3. Further, the local deposition of this glue at the location where block 302 would have been glued would be more difficult to implement than in the case described in relation with FIG. 3. Thus, taking the example of chip 1000, this would have resulted in pads 32 being arranged farther from block 302 in the case where block 302 would have been glued to the upper surface of interconnection structure 24 than in the case where this block is at least partly inserted into cavity 200. In other words, the provision of cavity 200 enables to increase the integration density of chip 1000, in particular as concerns electric connection elements formed at the level of the upper surface of interconnection structure 24.

Further, it would have been difficult, or even impossible, to modify the height of block 302 with respect to couplers 18 to maximize the optical coupling between fibers 304 and couplers 18, conversely to what has been described in relation with FIG. 3.

It could also have been devised to provide a cavity above each coupler 18 or, in other words, one cavity per coupler 18. This could have enabled to decrease the transmission losses of an optical signal between a fiber 304 and a corresponding coupler 18.

However, each cavity would then have had lateral dimensions in the order of those of the coupler 18 above which it is arranged, for example, a width and a length (for example measured in a plane parallel to the plane of layer 10) in the order of 50 µm each. In other words, each cavity above a corresponding coupler 18 would have had much smaller lateral dimensions, for example by at least one factor 5, than those of cavity 200. The filling of each of these small cavities with glue to fill the space available between the bottom of the cavity and surface 306 of block 302 would then be more difficult to implement than in the case of FIG. 3 where glue 300 fills the space between bottom 201 of cavity 200 and surface 306 of block 302.

Further, due to the fact that a portion at least of block 302 is inserted into cavity 200, the portion of block 302 protruding from the upper surface of interconnection structure 24 is less high than if block 302 would have been directly glued to this upper surface. This decreases risks of tearing of block 302 during the manipulation of the assembly of chip 1000 and of block 302. The mechanical resistance of the assembly of chip 1000 is even greater when glue 300 fills all or part of the space available between the lateral walls of cavity 200 and the lateral surfaces of block 302. Such a mechanical resistance could not be obtained in the case where block 302 would be directly glued to the upper surface of interconnection structure 24, and thus in the case where the glue would only be arranged between surface 306 of block 302 and the upper surface of interconnection structure 24, and possibly along a lower portion of the lateral surfaces of block 302.

It could also have been devised to use a block for holding the fibers of a fiber array such that, once inserted into cavity 200, the first ends of the fibers of the array are flush with a same lateral surface of the holding block, so that the first ends are directly appended to corresponding ends of a plurality of waveguides 16 ("butt coupling"), couplers 18 being then omitted.

In this case, the bottom of cavity 200 should have crossed layer 10 where waveguides 16 are defined, which would have decreased the quantity or surface area of layer 10 available to form components therein.

Further, a coupling by placing a fiber end directly against an end of a waveguide 16 would have been less efficient than a coupling to a coupler 18. Indeed, the dimensions of a waveguide 16 being much smaller than that of the core of a fiber 304, the quantity of light transmitted from the fiber to the waveguide would then have been less significant than with a coupler 18 which enables to collect a greater quantity of light.

Further, the alignment of an end of an optical fiber with an end of a waveguide 16 in the case of a coupling by placing of the end of the fiber directly against the end of waveguide 16 should be performed with a greater accuracy, for example, in the order of 0.1 µm, than the accuracy with which the alignment of an end of a fiber 304 with a coupler 18 is performed, the alignment accuracy being then for example in the order of 1 µm.

Figure 4:
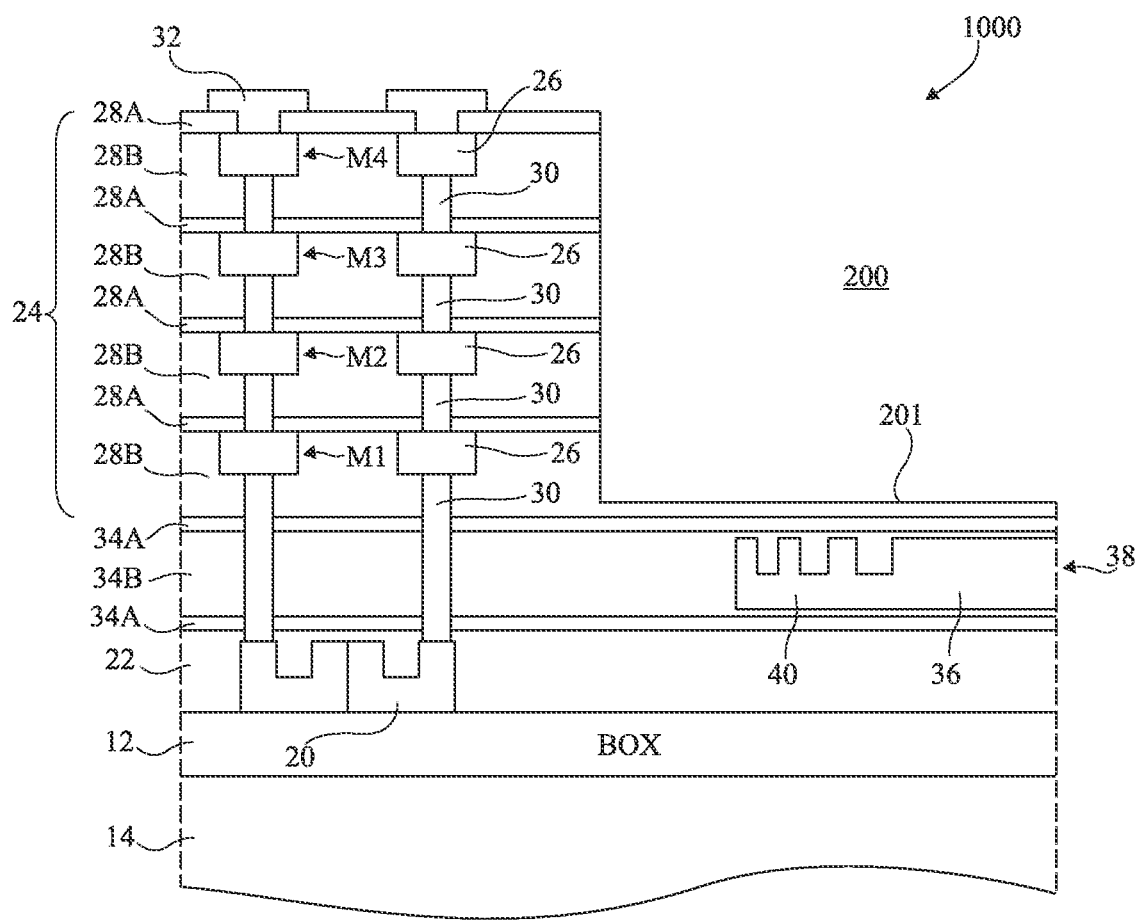
FIG. 4 schematically shows a cross-section view illustrating the step of FIG. 2 according to an alternative embodiment.

FIG. 4 schematically shows a cross-section view illustrating the step of FIG. 2 according to an alternative embodiment.

In this alternative embodiment, chip 1000 comprise an assembly of a plurality of couplers, for example, six couplers 40, a single one of which is shown in FIG. 3, intended to be optically coupled to first respective ends of the optical fibers 304 of a fiber array maintained in place in a holding block 302.

At the step of FIG. 4, chip 1000 preferably forms part of a semiconductor wafer comprising a plurality of identical chips 1000, the step described herein being then carried out simultaneously for all the chips 1000 of the wafer.

At this step, rather than etching cavity 200 at a location determined by the location of an assembly of couplers 18, cavity 200 is etched at a location determined by the location of the couplers 40 to which the first respective ends of fibers 304 of the fiber array held in block 302 would be coupled.

Similarly to what has been described in relation with FIG. 2, at the step illustrated in FIG. 4, the etching of the cavity is stopped at an intermediate level between the lower level of the metal level closest to couplers 40, here metal level M1, and the upper level of layer 36 having couplers 40 defined therein. Preferably, this intermediate level is above the upper level of layer 34B covering layer 10. In the example of FIG. 4, the etching is stopped in the layer 28B having metal level M1 arranged therein.

The lateral dimensions of cavity 200 and/or the location of cavity 200 are determined similarly to what has been described in relation with FIG. 2, with the difference that the couplers considered herein are couplers 40 rather than couplers 18.

At a next step, not illustrated, similarly to what has been described in relation with FIG. 3, glue 300 is arranged in cavity 200 and block 302 for holding the fibers 304 of the array is then inserted into cavity 200. It will be within the abilities of those skilled in the art to adapt what has been described in relation with FIG. 3 for couplers 18 and waveguides 16 to the case of FIG. 4 for couplers 40 and waveguides 36.

Further, all the advantages indicated hereabove in relation with FIGS. 2 and 3 can be found in this alternative embodiment by considering couplers 40, waveguides 36, and layer 38 rather than, respectively, couplers 18, waveguides 16, and layer 10.

Figure 5A:
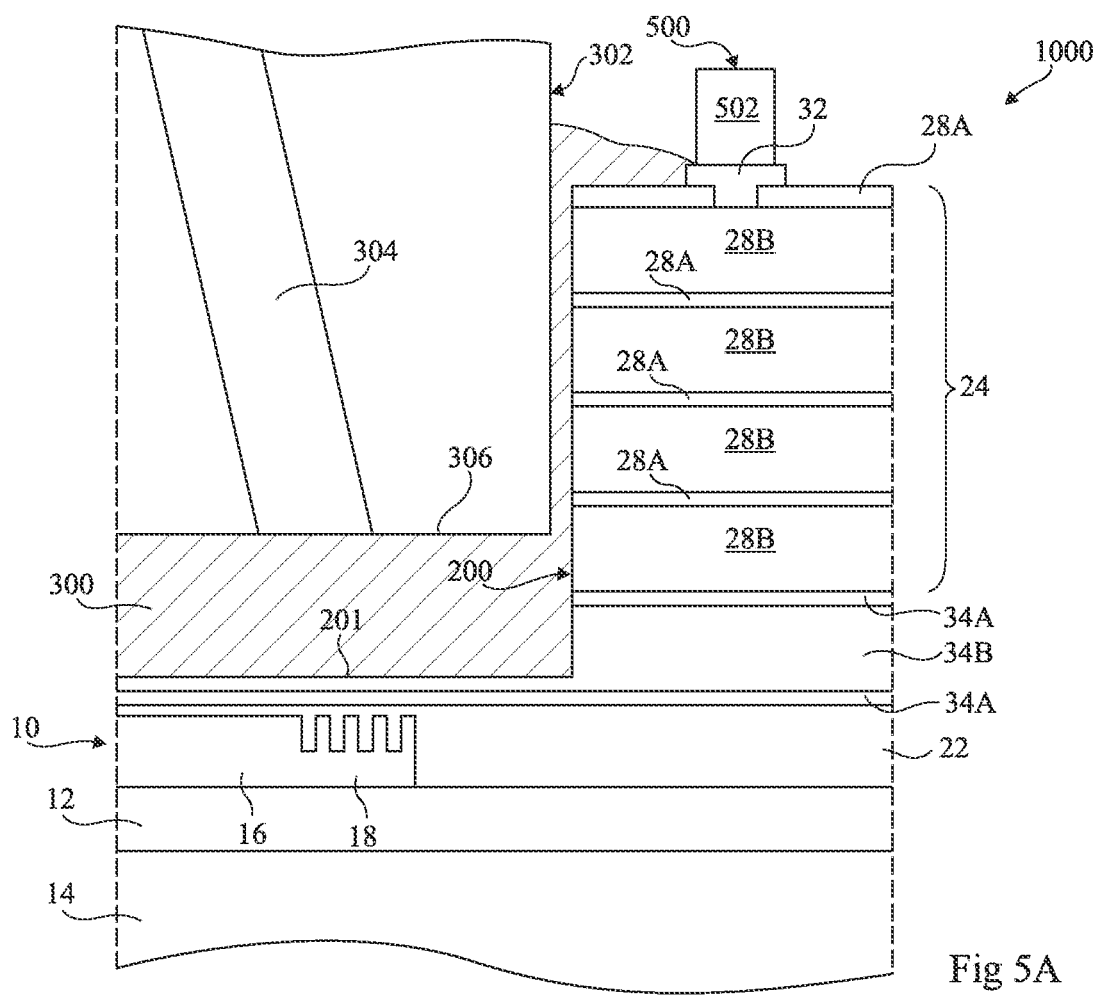
FIG. 5 includes two views FIGS. 5A and 5B, which illustrate an alternative embodiment of the method described in relation with FIGS. 2 and 3.
Figure 5B:
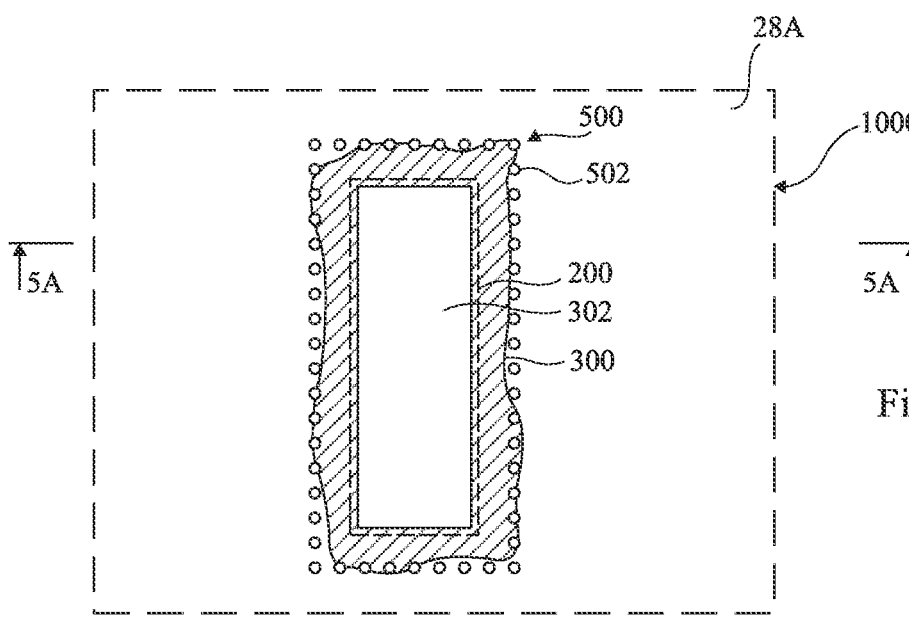

FIG. 5 schematically includes FIGS. 5A and 5B, which illustrate an alternative embodiment of the method described in relation with FIGS. 2 and 3. FIGS. 5A and 5B corresponding to the respective views of FIGS. 3A and 3B.

In this alternative embodiment, it is provided for chip 1000 to comprise, on the upper surface of interconnection structure 24, a guard ring 500 surrounding cavity 200. The guard ring protrudes from the upper surface of interconnection structure 24. As shown in FIG. 5, the guard ring is configured to decrease, or even to prevent, a flow of glue 300 beyond guard ring 500 when block 302 is inserted into cavity 200.

In this example, guard ring 500 is formed of a plurality of metal micropillars 502 distributed on the circumference of guard ring 500, micropillars 502 extending heightwise along a direction orthogonal to the upper surface of interconnection structure 24. In other words, micropillars 502 are arranged one after the others along the circumference of a ring. Preferably, a same pitch or, in other words, a same distance, separates two successive micropillars 502. Preferably, the pitch is determined by the viscosity of the glue 300 used, so that the flow of glue 300 on the upper surface of interconnection structure 24 is decreased, or even prevented, when glue 300 reaches guard ring 500.

Micropillars 502 are preferably identical to micropillars (not shown) of electric connection of chip 1000 to another integrated circuit chip, an interposer, or a printed circuit. As an example, each micropillar 502 rests on top of and in contact with a pad 32 arranged at the level of the upper surface of interconnection structure 24. Preferably, pad 32 is then electrically connected to no component of chip 1000 by vias 30 and metal levels M1, M2, M3, and M4 of interconnection structure 24.

As an example of size, each micropillar 502 has a height in the order of 10 µm, for example, of 10 µm, for a diameter in the order of 20 µm, the space between two neighboring micropillars 502 being then for example in the order of 20 µm.

As compared with the case where block 302 would have been directly glued to the upper surface of interconnection structure 24 and where such a guard ring 500 would have been provided, such a guard ring would have been larger than in the case of FIG. 5 or, in other words, would have been arranged at a distance from block 302 greater than in the case of FIG. 5. This thus enables to bring the electric connection elements, for example, other micropillars, metal balls, pads 32, etc. closer to block 302 with respect to the case where block 302 would have been directly glued to the upper surface of interconnection structure 24.

Such an alternative embodiment and the advantages thereof apply to the alternative embodiment described in relation with FIG. 4.

In the embodiments and variations described hereabove in relation with FIGS. 1 to 5, no via 30 and no portion of metal layers 26 is provided at the location of cavity 200 or, in other words, above couplers 18, respectively 40. However, this is already true in known chips of the type shown in FIG. 1 which are deprived of cavities 200 and for which block 302 is intend to be directly glued on the upper surface of interconnection structure 24. Indeed, in such known chips, the present of a via 30 or of a portion of metal layer 26 would disturb or even prevent the propagation of an optical signal between a fiber 304 and a corresponding coupler 18 or 40. Thus, the embodiments and variations described in relation with FIGS. 2, 3, 4, and 5 are compatible with known photonic chips.

Further, although advantages of the embodiments and variations described hereabove have been indicated in relation with the assembly of chip 1000 and of block 302 for holding the fibers 304 of the fiber array, such advantages are intrinsically present in chip 1000 provided with cavity 200 or, in other words, result from the provision of cavity 200 in chip 1000.

Various embodiments and variations have been described. It will be understood by those skilled in the art that certain features of these various embodiments and variations may be combined, and other variations will occur to those skilled in the art.

Finally, the practical implementation of the described embodiments and variations is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method, comprising:
forming a plurality of vertical grating couplers in a first layer of a semiconductor assembly, the first layer comprising a semiconductor layer or an insulating layer;
overlying a plurality of second insulating layers over the plurality of vertical grating couplers;
forming an interconnection structure comprising a plurality of metal levels and a plurality of metal vias embedded in the second insulating layers;
forming one or more phase modulators in the first layer, each phase modulator coupled to a respective metal via; and
etching a cavity extending in depth through the second insulating layers all the way to an intermediate level between the plurality of vertical grating couplers and the metal level closest to the plurality of vertical grating couplers, the cavity having lateral dimensions such that the cavity is capable of receiving a block for holding an array of optical fibers intended to be optically coupled to the plurality of vertical grating couplers.

2. The method of claim 1, wherein the lateral dimensions of the cavity are equal to lateral dimensions of the block plus a tolerance margin.

3. The method of claim 2, wherein the tolerance margin is between 10 μm and 200 μm.

4. The method of claim 2, wherein the tolerance margin is between 50 μm and 150 μm.

5. The method of claim 1, wherein the first layer is a semiconductor layer of a semiconductor on insulator (SOI) device.

6. The method of claim 1, wherein the first layer is an insulating layer made of silicon nitride.

7. The method of claim 6, wherein the first layer is disposed on a semiconductor layer of a semiconductor on insulator device, and wherein the cavity has a bottom opposite the plurality of vertical grating couplers.

8. The method of claim 1, further comprising a guard ring on an upper surface of the interconnection structure surrounding the cavity, wherein the guard ring is formed of a plurality of metal micropillars regularly distributed along the circumference of the guard ring.

9. A method, comprising:
forming a first insulating layer;
forming a plurality of vertical grating couplers in the first insulating layer;
overlying a plurality of second insulating layers over the plurality of vertical grating couplers;
forming an interconnection structure comprising a plurality of metal levels and a plurality of metal vias embedded in the second insulating layers;
forming one or more phase modulators in the first insulating layer, each phase modulator coupled to a respective metal via; and
etching a cavity extending in depth through the second insulating layers through an intermediate level between the plurality of vertical grating couplers and a respective metal level closest to the plurality of vertical grating couplers.

10. The method of claim 9, wherein the cavity comprises lateral dimensions such that the cavity is capable of receiving a block for holding an array of optical fibers intended to be optically coupled to the plurality of vertical grating couplers.

11. The method of claim 10, wherein the lateral dimensions of the cavity are equal to lateral dimensions of the block plus a tolerance margin, and wherein the cavity has a bottom opposite the plurality of vertical grating couplers.

12. The method of claim 9, wherein the first insulating layer is disposed on a semiconductor layer of a semiconductor on insulator device.

13. The method of claim 9, further comprising a guard ring on an upper surface of the interconnection structure surrounding the cavity, wherein the guard ring is formed of a plurality of metal micropillars regularly distributed along the circumference of the guard ring.

14. A method, comprising:
forming a plurality of vertical grating couplers in a first layer of a semiconductor assembly, the first layer comprising a semiconductor layer or an insulating layer;
overlying a plurality of second insulating layers over the plurality of vertical grating couplers;
forming an interconnection structure comprising a plurality of metal levels and a plurality of metal vias embedded in the second insulating layers;
forming one or more phase modulators in the first layer, each phase modulator coupled to a respective metal via; and
etching, from an upper surface of the interconnection structure, a cavity penetrating into the insulating layers down to an intermediate level between the couplers and the metal level closest to the couplers, the cavity having lateral dimensions such that the cavity is capable of receiving a block for holding an array of optical fibers intended to be optically coupled to the couplers.

15. The method of claim 14, wherein the method is implemented from a semiconductor wafer comprising a plurality of photonic integrated chips, wherein each photonic integrated chip comprises a respective one of the plurality of vertical grating couplers.

16. The method of claim 15, further comprising singulating the semiconductor wafer into a plurality of separate photonic integrated chips.

17. The method of claim 15, further comprising:
arranging glue in the chip cavity of one of the chips;
inserting and positioning the block in the cavity to optically couple ends of the fibers to the couplers of the one of the chips; and
hardening the glue.

18. The method of claim 17, wherein hardening the glue comprises hardening the glue by polymerization caused by an exposure to a light radiation.

19. The method of claim 17, wherein the one of the chips further comprises a guard ring on an upper surface of the interconnection structure surrounding the cavity and wherein arranging the glue comprises using the guard ring to avoid flow of the glue beyond the guard ring.

20. The method of claim 14, wherein the lateral dimensions of the cavity are equal to lateral dimensions of the block plus a tolerance margin.

\* \* \* \* \*